(12) United States Patent
Du et al.

(10) Patent No.: US 11,775,594 B2
(45) Date of Patent: Oct. 3, 2023

(54) METHOD FOR DISAMBIGUATING BETWEEN AUTHORS WITH SAME NAME ON BASIS OF NETWORK REPRESENTATION AND SEMANTIC REPRESENTATION

(71) Applicant: Computer Network Information Center, Chinese Academy of Sciences, Beijing (CN)

(72) Inventors: Yi Du, Beijing (CN); Hanxue Wang, Beijing (CN); Ziyue Qiao, Beijing (CN); Yuanchun Zhou, Beijing (CN)

(73) Assignee: Computer Network Information Center, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/603,391

(22) PCT Filed: Dec. 26, 2019

(86) PCT No.: PCT/CN2019/128642
§ 371 (c)(1),
(2) Date: Oct. 13, 2021

(87) PCT Pub. No.: WO2021/128158
PCT Pub. Date: Jul. 1, 2021

(65) Prior Publication Data
US 2022/0318317 A1    Oct. 6, 2022

(30) Foreign Application Priority Data
Dec. 25, 2019 (CN) .......................... 201911352416.9

(51) Int. Cl.
*G06F 16/93* (2019.01)
(52) U.S. Cl.
CPC ................... *G06F 16/93* (2019.01)

(58) Field of Classification Search
CPC ................ G06N 20/00; G06F 16/93
See application file for complete search history.

(56) References Cited

U.S. PATENT DOCUMENTS

2011/0137898 A1    6/2011   Gordo et al.

FOREIGN PATENT DOCUMENTS

| CN | 105653590 A | 6/2016 |
|---|---|---|
| CN | 106021424 A | 10/2016 |
| CN | 109558494 A | 4/2019 |

OTHER PUBLICATIONS

In-Su Kang Ed—Gosse Bouma et al: "Author Disambiguation Using Wikipedia—Based Explicit Semantic Analysis", Jun. 26, 2012 (Jun. 26, 2012), Natural Language Processing and Information Systems Springer Berlin Heidelberg, Berlin, Heidelberg, pp. 351 354 XP047008633, ISBN: 978-3-642-31177-2.

(Continued)

*Primary Examiner* — Hau H Hoang
(74) *Attorney, Agent, or Firm* — SV Patent Service

(57) ABSTRACT

The present invention discloses a method for disambiguating between authors with a same name on basis of network representation and semantic representation. The method includes: extracting semantic and discrete features of each publication in a target publication library; calculating a similarity between the theses based on the discrete features to obtain a relationship similarity matrix of the theses; if the publication has no common author or institution with other theses, it is added into an discrete publication set; calculating a semantic similarity matrix of the theses based on the semantic features of the theses; and adding theses which do not contain the semantic features in the target publication library to the discrete publication set; performing weighted summation on the relationship similarity matrix and the semantic similarity matrix to obtain a publication similarity matrix and clustering the same; adding theses which do not (Continued)

belong to any cluster to the publication discrete set; and allocating the theses in the discrete publication set to corresponding clusters by using a method based on similarity threshold matching. The present invention enables disambiguation between the authors of the same name of theses with high accuracy.

9 Claims, 2 Drawing Sheets

(56) References Cited

OTHER PUBLICATIONS

Zhang Yutao YT—ZHANG13QMAILS Tsinghua Edu CN et al: "Name Disambiguation in a Miner Clustering, Maintenance, and Human in the Loop", High Performance Compilation, Computing and Communications, ACM, 2 Penn Plaza, Suite 701New YorkNY10121-0701USA, Jul. 19, 2018 (Jun. 19, 2018), pp. 1002-1011, XP058654402, DOI: 10.1145/3219819.3219859 ISBN: 978-1-4503-6638-0.

Zhang Baichuan ZHAN1910QPURDUE Edu et al: "Name Disambiguation in Anonymized Graphs using Network Embedding", Proceedings of the 2017 ACM on Conference on Information and Knowledge Management, ACMPUB27, New York, NY, USA, Nov. 6, 2017 (Nov. 6, 2017), pp. 1239-1248, XP058542111, DOI: 10.1145/3132847.3132873 ISBN: 978-1-4503-5586-5.

Ryan Perozzi et al: "DeepWalk", Knowledge D iscovery and Data Mining, ACM, 2 Penn Plaza, Suite 701 New York NY 10121-0701 USA, Aug. 24, 2014 (Aug. 24, 2014), pp. 701-710, XP058053805, DOI: 10.1145/2623330.2623732 ISBN: 978-1-4503-2956-9.

METHOD FOR DISAMBIGUATING BETWEEN AUTHORS WITH SAME NAME ON BASIS OF NETWORK REPRESENTATION AND SEMANTIC REPRESENTATION

TECHNICAL FIELD

The present invention mainly relates to the field of entity disambiguation, heterogeneous network embedding technology and word vector embedding technology, and in particular to a disambiguation technology for authors with a same name of theses based on network representation and semantic representation.

BACKGROUND OF THE INVENTION

Same name disambiguation has been viewed as a significant but challenging problem in many areas, such as literature management, social network analysis, etc. In the field of academic network, the emergence of various academic search systems, such as Google Scholar, Aminer, etc. provides great convenience for the search and academic exchange of theses. However, due to the huge number of theses and the complexity and diversity of the publication information, there are a large number of theses to be assigned with errors, and the ambiguity of the authors with the same name is an important but difficult problem. Disambiguation between the authors with the same name of theses refers to the use of the publication's information, such as title, author, author organization, abstract, keywords, etc. to distribute the publication to the correct author file by some methods. At present, many researchers have proposed solutions to the disambiguation problem of the authors with the same name. These methods mainly include using the publication information for rule-based matching, or using representation learning methods to characterize the publication information, and then using clustering methods, such as hierarchical clustering, DBSCAN, etc. to cluster the similar theses into a cluster and divide dissimilar theses into different clusters. Semantic representation learning is a technology that transforms the original data into a form that can be effectively developed by machine learning. Using the representation learning of theses, the semantic information of theses can be mapped to the hidden layer for clustering. With the introduction of the network representation learning methods such as DeepWalk learning and LINE learning, a method for disambiguation between authors with a same name based on network representation is proposed. By constructing the publication network, it maps the characteristics of the publication into a new space, so that similar theses are closer in space and dissimilar theses are more distant in space, and then the theses are clustered to achieve disambiguation between authors with the same name.

SUMMARY OF THE INVENTION

The object of the present invention is to provide a method for disambiguating between authors with a same name on basis of network representation and semantic representation. By using the relevant information of the publication, including the title, abstract, authors, institutions, journals, etc. of the publication, the method can effectively mine the relationship information between the theses and the semantic information of the text of the publication, then obtain a publication representation vector and a publication similarity matrix, and divide the publication sets of different authors into different clusters by clustering the similarity matrix so as to realize the disambiguation between the authors of the same name. In addition, the similarity threshold matching method is used to further deal with some discrete theses in the above process, so as to achieve disambiguation between the authors with the same name of theses with high accuracy.

The invention can specifically include the following steps.

Step 1: analyzing the relevant information of theses in the publication library, and dividing features into semantic and discrete features.

Step 2: constructing a heterogeneous network based on the publication and publication relationships based on the discrete features of step 1, and generating a path set including the publication id by the random walk method of meta path, and obtaining the relationship similarity matrix of publication by training the relationship representation vector of publication using the word2vec model.

Step 3: based on the semantic feature of step 1, training the word vector by word2vec to obtain a semantic representation vector of publication and then obtain a semantic similarity matrix of the publication.

Step 4: clustering by the DBSCAN algorithm based on the similarity matrix generated by steps 2 and 3, and the cluster after clustering represents the publication set contained by the real author.

Step 5: processing the discrete publication set generated in the above-mentioned step 2, step 3 and step 4 by using a method based on similarity threshold matching, and allocating the theses in the discrete publication set to a correct cluster.

The technical solution of the present invention comprises the followings.

A method for disambiguating between authors with a same name on basis of network representation and semantic representation can include the following steps:

1) extracting semantic and discrete features of each publication in a target publication library, wherein the target publication library is a publication library obtained from the authors to be disambiguated;

2) constructing a heterogeneous network of the theses based on the discrete features of each publication, generating a path set based on the heterogeneous network and taking the same as training corpus to train a model, using the model to generate a relationship representation vector of the theses in the target publication library, and calculating the similarity between each publication according to the relationship representation vector to obtain a relationship similarity matrix of the theses; for a publication a in the target publication library, if the publication a has no common author or institution with other theses, it is added into an discrete publication set;

3) generating a semantic representation vector of the publication based on the semantic features of each publication, and then calculating the similarity of each publication according to the semantic representation vector to obtain a semantic similarity matrix of the publication; and adding theses which do not contain the semantic features in the target publication library to the discrete publication set;

4) performing weighted summation on the relationship similarity matrix and the semantic similarity matrix to obtain a publication similarity matrix and clustering the same, each cluster after clustering representing a publication set from an author; adding theses which do not belong to any cluster to the publication discrete set; and 5) allocating the theses in the discrete publication set to corresponding clusters by using a method based on similarity threshold matching.

Furthermore, the step of allocating the theses in the discrete publication set to corresponding clusters by using a method based on similarity threshold matching can include:

11) selecting a publication $p_i$ from the discrete publication set, for each publication $p_j$ in each cluster, the similarity $s(p_i, p_j)$ between the publication $p_i$ and the publication $p_j$ is initialized to 0;
12) calculating $s(p_i, p_j)=s(p_i, p_j)+$(a number of common authors of $p_i$ and $p_j$)×N, where N is a set empirical value;
13) calculating $s(p_i, p_j)=s(p_i, p_j)+$tanimoto(the journal name of $p_i$, the journal name of $p_j$), wherein the function tanimoto(p, q) is used to calculate the tanimoto similarity of two sets p, q;
14) calculating $s(p_i, p_j)=s(p_i, p_j)+$tanimoto(the institution of the author to be disambiguated in $p_i$, the institution of the author to be disambiguated in $p_j$);
15) calculating $s(p_i, p_j)=s(p_i, p_j)+$(a co-word number of the subject and the keyword in $p_i$ and $p_j$)/M, where M is a set empirical value; and
16) if $s(p_i, p_j)$ calculated in step 15) is greater than a set threshold value a, allocating the publication $p_i$ into a cluster where the publication $p_j$ is located, otherwise allocating the publication $p_i$ into a new cluster alone.

Further, the function $tanimoto(p, q) = \frac{p \cap q}{p \cup q}$

Furthermore, for the theses in the discrete publication set, the similarity is calculated by twos, and the clusters in which the two are respectively located are merged if the similarity is greater than a set threshold.

Further, the step of constructing a heterogeneous network can include taking each publication in the target publication library as a node in the heterogeneous network, and setting several relationships; and if there is a certain set relationship between the two theses, constructing an edge between nodes corresponding to the two theses, and setting a weight value of the edge to obtain the heterogeneous network.

Further, the setting the relationships can include having a common author and a common institution.

Further, the path set is generated by the random walk strategy based on the meta path.

Further, the discrete features comprise authors and institutions; and the semantic features can include title, journal, institution, publication year, and keywords.

Further, the model can be the word2vec model.

A computer readable storage medium is characterized by storing a computer program comprising instructions for performing the steps of the method of the above method.

Compared with convetional technologies, the invention has the following beneficial effects.

The present invention can obtain the representation vector of the theses by using the relationship features between the theses and the semantic features of the theses, and then cluster the theses to achieve disambiguation. Meanwhile, the present invention also takes into account that there may be some theses whose features are not obvious enough and the similarity is small compared with other theses, and proposes a method based on the similarity threshold matching to further process these discrete theses, thereby improving the accuracy of disambiguation.

DETAILED DESCRIPTION OF THE INVENTION

The present invention will now be further described with reference to the accompanying drawings and embodiments.

Figure 1:
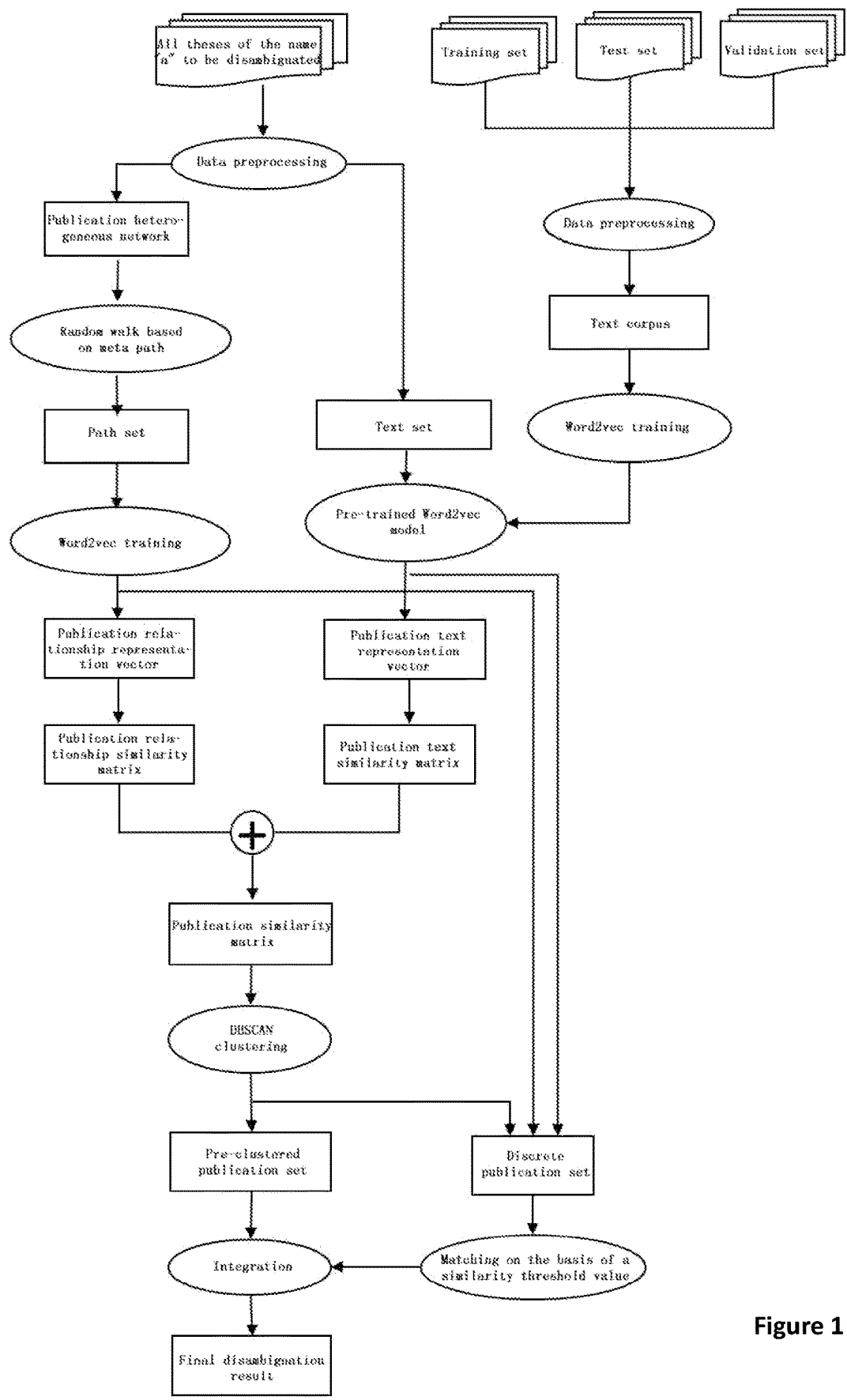
FIG. 1 is a model architecture diagram of the present invention.

The present invention aims to solve the ambiguity problem of the authors with the same name of the theses, and uses some main information of the theses, such as title, abstract, author, journal, author organization, publication year and keywords, to learn the relationship representation and semantic representation of the theses and cluster them using a clustering method; and meanwhile, the present invention processes the discrete theses generated in the process using a method based on the similarity threshold matching, so as to obtain a final publication division result. Namely, theses of real same author are divided into one cluster, and theses of different authors are in different clusters. FIG. 1 is a model architecture diagram of the present invention.

Step 1: analyzing the relevant information of theses in the publication library, and dividing features into semantic and discrete features.

Firstly, the features are analyzed. According to the different types of information contained in the features, the features are divided into two types: semantic and discrete features. Semantic features refer to features with text information, such as titles, abstracts, keywords, which can be transformed into text vectors using semantic representation learning models, such as word2vec, etc. Discrete features mean that the features themselves have little value, but they can be used to express the relationship between theses, such as authors, institutions, etc. Some of these features can be regarded as either discrete or semantic features. In a specific embodiment, the invention defines the author and the entity as discrete features, and defines the title, journal, institution, publication year, and keywords as semantic features.

Step 2: constructing a heterogeneous network based on the publication and publication relationships based on the discrete features of step 1, and generating a path set including the publication id by the random walk strategy of meta path, and obtaining the relationship similarity matrix of publication by training the relationship representation vector of publication using the word2vec model, in particular, the word2vec model in a gensim library in python.

This part extracts the publication's relationship information from the publication's discrete features by the network embedding method to realize the representation learning of the publication's relationship.

Figure 2:
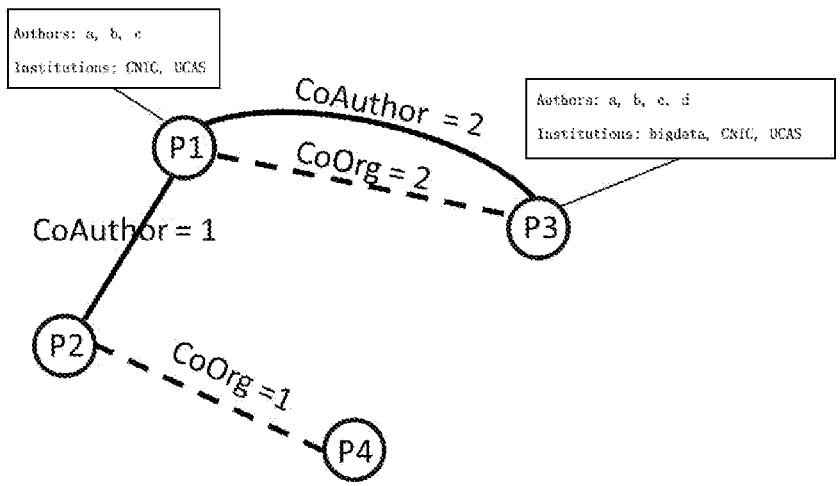
FIG. 2 is a schematic diagram of a heterogeneous network.

First, a heterogeneous network of theses is built. For each name that needs to be disambiguated, the relationships between all corresponding theses are extracted to construct a heterogeneous network of theses, as shown in FIG. 2. The network mainly comprises one type of node: article, and two types of edges: coAuthor, CoOrg.

CoAuthor represents that there are common authors between two theses(excluding the names that need to be disambiguated), and the weights on the edge represent the number of common authors. If there is a common author between two theses, the edge of corresponding weight is built according to the number of common authors; and if there is no common author between two theses, the edge is not built.

CoOrg represents the similarity relationship of the institutions in the two theses with names to be disambiguated. When constructing the CoOrg relationship of the theses, the author institutions of the two theses with author names to be disambiguated are regarded as the set of words after removing stop words, and the similarity relationship of the institutions depends on the number of intersections of the set of words of the two institutions. That is, if the author institutions of the two theses have co-occurring words, an edge is constructed for which the number of corresponding co-occurring words is a weight; and if the intersection of the intersection of the author institutions of the two theses is 0, i. e. there is no co-occurring word between the two institutions, this edge is not constructed.

Figure 3:
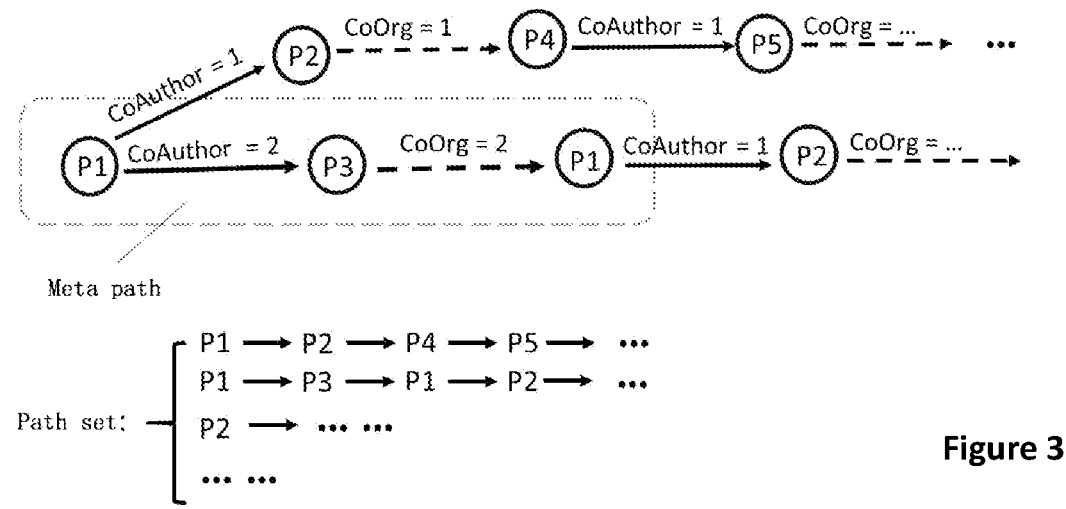
FIG. 3 is a schematic diagram of random walk path generation based on a meta path.

After building the heterogeneous network of theses, a meta path based on p1→CoAuthor→p2→CoOrg→p3 is used to make random walk and generate a path set composed of publication id. In a specific process, it selects each publication node in the publication heterogeneous network as an initial node in turn, and takes random walk according to the above-mentioned meta path, wherein each walk is an edge of a certain type specified according to the current meta path, a next node connected by the edge of the type is selected as a next walk node according to the weight of the edge and with a certain probability, and the node is stored in a path set. It is specified that the transition probability of random walk is proportional to the weight of edge. A publication id path is obtained by repeating such walks several times until the prescribed path length is reached. Then, by reselecting another node in the heterogeneous network as the initial node, the same operation is performed to obtain the corresponding publication id path. With N iterations of the above process, the publication id path set is obtained as the training corpus of relationship representation learning. A schematic diagram of the random walk process is shown in FIG. 3.

The publication id path set can be obtained by the above-mentioned random walk process, the path set can be used as a training corpus, and the skip-gram model in word2vec can be used for training, so as to obtain the relationship representation vector of the publication. Word2vec characterizes word semantic information by means of word vectors by learning the text, i. e. semantically similar words are very close in the pace via an embedding space. By word vector embedding, the theses with similar relationships will also have a closer distance in the embedding space.

After obtaining the relationship representation vectors of the theses, the relationship similarity matrix of the theses can be obtained by using the cosine similarity calculation method. In addition, the present invention uses the idea of bagging to repeat the above-mentioned process several times to obtain a plurality of publication relationship similarity matrices, and sums and averages them to obtain a final publication relationship similarity matrix.

Among them, the theses without the above two relationships with other theses are added to the discrete publication set and then process them separately.

Step 3: based on the semantic feature of step 1, training the word vector by word2vec to obtain a semantic representation vector of publication and then obtain a semantic similarity matrix of the publication.

In the publication semantic representation learning, all the features with semantic information in the publication data are combined as a corpus, which mainly includes the title, abstract, journal and all the authors' institutions of the publication. The word vectors in this corpus is trained by the Word2vec model after data cleaning, word segmentation and stop-word removal to obtain a word vector pre-training model for constructing the semantic representation vector of the publication.

For each publication, semantic features is used to obtain the semantic representation vector of the publication by the word vector pre-training model. These semantic features include the title, journal, institution, publication year, keywords, etc. of the publication. The text information corresponding to each publication can be obtained by data cleaning, lowercasing, word segmentation, stop-word removal and other operations on these semantic features. With the word vectors pre-trained previously, a corresponding text vector can be obtained for the text information of each text, wherein the text vector is obtained by averaging the word vectors. These text vectors constitute the semantic representation vectors of the publication.

After obtaining the semantic representation vector of the theses, the semantic similarity matrix of the theses is also obtained by using the cosine similarity calculation method.

The theses that do not contain semantic features are added to the discrete publication set and then process them separately.

Step 4: clustering by the DBSCAN algorithm based on the similarity matrix generated by steps 2 and 3, and the cluster after clustering represents the publication set contained by the real author.

With regard to the publication relationship similarity matrix and the publication semantic similarity matrix obtained in the above-mentioned process, the two similarity matrices are weighted and summed to obtain a final publication similarity matrix; and by the experiments, the publication relationship similarity matrix and the publication semantic similarity matrix are both set to have a weight of 0.5. Then the DBScan algorithm in the clustering algorithm is used to cluster them, specifically using the DBSCAN method in the sklearn.cluster library in python. This method does not need to predetermine the number of clusters(K-value), and our parameters are set as shown in the following table.

| Parameters | Values |
| --- | --- |
| Eps | 0.2 |
| Min_samples | 4 |
| metric | precomputed |

In the clustering process, a minimum number of samples is set as 4, i. e. the minimum number of theses in a cluster is 4, so that some theses which are not similar to other theses will not belong to any cluster, and these theses are added into the discrete publication set and process them separately.

Step 5: processing the discrete publication set generated in the above-mentioned step 2, step 3 and step 4 by using a method based on similarity threshold matching, and allocating the theses in the discrete publication set to a correct cluster.

The discrete publication sets generated in the above three steps are processed using a method based on similarity threshold matching.

First, a similarity rule is defined, where $s(p_i, p_j)$ denotes the similarity of publication $p_i$ and publication $p_j$.

1. Initial $s(p_i, p_j)$ is 0;
2. $S(p_i, p_j)=s(p_i, p_j)+$(a number of common authors of $p_i$ and $p_j$)×1.5;
3. $S(p_i, p_j)=s(p_i, p_j)+$tanimoto(the journal name of $p_i$, the journal name of $p_j$);
4. $S(p_i, p_j)=s(p_i, p_j)+$tanimoto(the institution of the author to be disambiguated in $p_i$, the institution of the author to be disambiguated in $p_j$);
5. $S(p_i, p_j)=s(p_i, p_j)+$(a co-word number of the subject and the keyword in $p_i$ and $p_j$)/3.0;
6. Output $s(p_i, p_j)$.

Among them, tanimoto(p, q) refers to the tanimoto similarity of two character string sets, and p, q are the corresponding character strings:

$$\text{Tanimoto}(p, q) = \tfrac{}{} \quad (1)$$

For each publication in the discrete publication set, firstly, the similarity between it and the clustered theses is compared. If the similarity between it and the publication with the highest similarity is greater than the threshold value a, it is allocated to the cluster in which the clustered publication is located, otherwise to a new cluster alone. Secondly, for each publication in the discrete publication set, its similarity with the theses in other discrete sets is compared. If the similarity between the both is greater than the threshold value a, the clusters where the two are located are merged. Here, the threshold value a is defined to be 1.5.

By the above matching method based on the similarity threshold, those theses with less obvious features(discrete theses) can be processed, and the processed results are combined with the previous pre-clustered results to obtain the final publication clustering results and achieve the disambiguation between the authors with the same name.

The above embodiments are merely illustrative of the present invention and are not intended to be limiting thereof, and modifications or equivalent replacements may be devised by those skilled in the art without departing from the spirit and scope of the present invention, which is defined in the appended claims.

What is claimed is:

1. A method for disambiguating between authors with a same name on basis of network representation and semantic representation, comprising:
   1) extracting semantic features and discrete features of each publication in a target publication library, wherein the target publication library is a publication library obtained from the authors to be disambiguated;
   2) constructing a heterogeneous network of theses based on the discrete features of each publication, generating a path set based on the heterogeneous network and taking the path set as training corpus to train a model, using the model to generate a relationship representation vector of the theses in the target publication library, and calculating a similarity for each publication according to the relationship representation vector to obtain a relationship similarity matrix of the theses; for a publication A in the target publication library, if the publication A has no common author or institution with other theses, the publication A is added into an discrete publication set;
   3) generating a semantic representation vector of each publication based on the semantic features of each publication, and then calculating the similarity of each publication according to the semantic representation vector to obtain a semantic similarity matrix of the publication; and adding theses which do not contain the semantic features in the target publication library to the discrete publication set;
   4) performing weighted summation on the relationship similarity matrix and the semantic similarity matrix to obtain a publication similarity matrix and clustering the publication similarity matrix into clusters each representing a publication set from an author; adding theses which do not belong to any cluster to the discrete publication set; and
   5) allocating the theses in the discrete publication set to corresponding clusters using similarity threshold matching.

2. The method according to claim 1, wherein step of allocating the theses in the discrete publication set to corresponding clusters using similarity threshold matching comprises:
   11) selecting a publication pi from the discrete publication set, for each publication pj in each cluster, the similarity s(pi, pj) between the publication pi and the publication pj is initialized to 0;
   12) calculating s(pi, pj)=s(pi, pj)+(a number of common authors of pi and pj)×N; where N is a set empirical value;
   13) calculating s(pi, pj)=s(pi, pj)+tanimoto(the journal name of pi, the journal name of pj); wherein the function tanimoto(p, q) is used to calculate the tanimoto similarity of two sets p, q;
   14) calculating s(pi, pj)=s(pi, pj)+tanimoto(the institution of the author to be disambiguated in pi, the institution of the author to be disambiguated in pj);
   15) calculating s(pi, pj)=s(pi, pj)+(a co-word number of the subject and the keyword in pi and pj)/M; where M is a set empirical value; and
   16) if s(pi, pj) calculated in step 15) is greater than a set threshold value a, allocating the publication pi into a cluster where the publication pj is located, otherwise allocating the publication pi into a new cluster alone.

3. The method according to claim 2, wherein tanimoto

The method according to claim 2, wherein $\text{tanimoto}(p, q) = \tfrac{}{}$.

4. The method according to claim 1, wherein for the theses in the discrete publication set, the similarity is calculated by twos, and the clusters in which the two are respectively located are merged if the similarity is greater than a set threshold.

5. The method according to claim 1, wherein step of constructing a heterogeneous network comprises taking each publication in the target publication library as a node in the heterogeneous network; setting relationships; and if there is a certain set relationship between the two theses, constructing an edge between nodes corresponding to the two theses, and setting a weight value of the edge to obtain the heterogeneous network.

6. The method according to claim 5, wherein step of setting relationships comprises having a common author and a common institution.

7. The method according to claim 1, wherein the path set is generated by the random walk strategy based on a meta path.

8. The method according to claim 1, wherein the discrete features comprise authors and institutions; and the semantic features comprise title, journal, institution, publication year, and keywords.

9. The method according to claim 1, wherein the model is a word2vec model.

\* \* \* \* \*